UNITED STATES PATENT OFFICE.

FREDERICK T. SNYDER, OF OAK PARK, ILLINOIS.

STEEL PROCESS.

1,254,078.

Specification of Letters Patent.

Patented Jan. 22, 1918.

No Drawing.

Application filed January 16, 1915. Serial No. 2,535.

*To all whom it may concern:*

Be it known that I, FREDERICK T. SNYDER, citizen of the United States, residing at Oak Park, in the county of Cook and State of Illinois, have invented a certain new and useful Improvement in Steel Processes, of which the following is a full, clear, concise, and exact description.

My invention relates to a process of making steel. One of its objects is to provide an efficient and economical process of producing steel from pig-iron at less cost than by either the Bessemer or the open hearth process, and in which the steel is not contaminated by nitrogen, and hence is of a quality superior to that produced by either of the aforementioned processes. A further object is to prevent, as far as possible, the heat losses of the furnace. A still further object is to reduce to a minimum the amount of flux or slag-producing material that is necessary for slagging off the impurities of the bath.

In accordance with my process, the slag employed for taking up the impurities from the bath is not removed from the furnace at the finish of a heat but is retained in the furnace as the initial slag of the next succeeding heat. Instead, therefore, of providing a fresh slag at the beginning of each heat and pouring it off at the end of the heat as is customary, the old slag from the preceding heat is made to serve as an initial slag of a new heat. Later this slag is poured off and fresh slag-producing material added to the partially purified bath for finishing the treatment. This finishing or final slag is retained in the furnace when the steel is poured and is used as the initial slag of the next succeeding charge. Thus, without increasing the total number of slags and without providing more slags than there are heats, each heat is subjected to the action of two distinct slags; during the first period to the action of an old slag consisting of the final slag of the last preceding heat, and, during the second period, to the action of a fresh slag added to the bath after it has been partially purified by the old slag.

In practising my invention, an electric furnace of any suitable type may be employed, but preferably a tilting furnace (in order that the slag may be readily poured from the partially purified bath) provided with a tapping opening nearer the bottom of the furnace in order that the steel may be tapped from beneath the surface of the final slag and the latter retained in the furnace.

The process is preferably so practised that the retained final slag from one heat is somewhat high in iron oxid and in lime, so that it is stiff and thick. For example, the retained final slag may contain 53% lime and 25% iron oxid as compared with the usual slag taken off a "finished" heat of steel which contains less than 10% iron oxid. Accordingly the steel tapped from beneath the surface of this final slag will be in an oxidized condition, it being preferred to finish the steel after it has been tapped from the furnace. If, where the furnace lining has been repaired, there has been any considerable delay, the electric current may be turned on to keep this slag hot. The mixer-metal or molten pig-iron is poured into the furnace on top of the slag. In the resulting reaction, most of the silicon in the mixer-metal is oxidized by the iron oxid of the old slag, the silica passing into the slag and the iron simultaneously reduced from the iron oxid passing into the bath. By proper regulation of the electric current, a temperature may be maintained suitable for the oxidation of the silicon contained in the mixer-metal, the temperature being kept relatively low for this purpose. This relatively low temperature is also conducive to the retention in the slag of the phosphorus which is at this stage also oxidized out of the bath. Since the slag is high in lime it is not completely neutralized by the silica and hence will also take up the phosphorus. A limited amount of iron ore may be added to the bath if the iron contents of the old slag is not sufficient to complete the removal of the silicon from the mixer-metal. The entrance of the silica into the old slag makes the slag thin, so that it will pour readily. At the end of this first period, which is ordinarily of about forty minutes duration, the old slag is poured off, the mixer-metal being now to a large extent purified of its silicon and phosphorus. The composition of the slag poured off may be, for example, 30% silica, 0.38% phosphorus and 5% iron oxid, as compared with the original left-over slag which contains 10% silica, 0.27% phosphorus and 25% iron oxid.

After the old slag is poured off, fresh slag-forming material is added to the partially purified bath. This marks the beginning of the second period of the process. Assuming that the furnace charge is 2240 pounds of mixer-metal, this fresh slag-forming addition may consist, for example, of approximately 250 pounds of lime and 400 pounds of iron ore. Under the influence of the heat supplied electrically to the furnace, this oxidizing slag rapidly oxidizes the remaining carbon and phosphorus. This second period of the process is ordinarily of approximately one hour's duration.

When the reaction between the final slag and the bath is complete, the metal is tapped out, and the slag, which, as hereinbefore stated, is high in iron-oxid and lime, is held back in the furnace to be used as the initial slag of the next heat. Keeping this slag in the furnace when the steel is poured not only holds back iron which would otherwise be lost, but it also conserves a considerable amount of heat. This is due to the fact that the steel is poured at about 1600° C., whereas the incoming mixer-metal is at about 1300° C., and hence the retained, old slag gives up some of its heat to the new charge of mixer-metal. By giving up some of its heat, the cooler slag is better enabled to take up and retain phosphorus.

The oxidation of the silicon in the first period produces some heat, so that the temperature of the molten material gradually rises. This increased temperature assists the silica in thinning the slag and enables the slag to be more readily poured from the metal at the end of the first period.

Since heat is furnished electrically, it can be furnished at any desired rate, and the reaction can be suitably speeded up. In a flame-heated furnace the transfer of heat from the flame to the bath is a slow operation and results in long heats. In my process, by reason of the high speed of operation due to supplying the heat electrically, there is relatively small addition to the slag of silica from roof drippings, and hence relatively little lime is required to neutralize this silica. This results in a very material saving in the amount of lime or other basic slag-forming material, and in the amount of slag which has to be melted.

My process, therefore, is an economical one, being rapid in operation, utilizing to the highest degree the heat developed in the furnace, and requiring much less than the usual amount of lime or other basic slagging material. Moreover, since the oxidation of the impurities from the mixer-metal is effected by the iron oxid of the slag in place of a blast of air or a nitrogen-carrying flame, the resulting product is steel uncontaminated by nitrogen.

What I claim is:—

1. The continuous process of making steel which consists in charging pig-iron into an electric furnace in which there has been retained from a preceding heat a slag high in iron-oxid and lime, removing this slag after the iron oxid has reacted with the silicon of the pig-iron, then adding lime and iron-oxid to the metal bath in sufficient quantities to leave at the end of the heat a slag high in iron-oxid and lime, electrically heating these additions to cause the iron-oxid to react with the carbon and the phosphorus of the pig-iron and finally pouring the metal while retaining the oxidizing slag for a succeeding heat.

2. The continuous process of making steel which is exceptionally low in phosphorus which consists in charging pig-iron, without other slag forming material, into an electric furnace, containing an oxidizing lime slag from the preceding heat, removing this slag after the silicon of the pig-iron has been oxidized, adding lime and iron-oxid to form a new slag and removing the steel in an oxidized condition while retaining this new slag in the furnace.

3. The continuous process of making steel which is exceptionally low in phosphorus which consists in charging pig-iron into an electric furnace containing a highly oxidizing lime slag from the preceding heat, removing this slag as soon as the silicon of the pig-iron has been oxidized, making a new slag by the addition of lime and iron-oxid and removing the steel in an oxidized condition while retaining the slag in the furnace.

4. The continuous process of making steel from pig-iron, which consists of pouring the pig-iron into a furnace containing from the preceding heat a slag high in iron-oxid and lime, allowing the silicon in the pig-iron to displace the iron from the slag, then removing the slag with its contained silicon, adding iron-oxid and lime in the middle of the heat only, to convert the iron into steel and form a new slag, and when the steel is poured, holding back in the furnace the new slag for a succeeding heat.

In witness whereof, I hereunto subscribe my name this 11th day of January, A. D. 1915.

FREDERICK T. SNYDER.

Witnesses:
McCLELLAN YOUNG,
GEORGE E. FOLK.